(12) United States Patent
Rolston

(10) Patent No.: US 6,264,362 B1
(45) Date of Patent: *Jul. 24, 2001

(54) APPARATUS FOR AND METHODS OF MEASURING HEAT FLUX IN A TUNNEL OVEN

(75) Inventor: Robert Mitchell Rolston, High Wycombe (GB)

(73) Assignee: United Biscuits (UK) Limited, Middlesex (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/242,672

(22) PCT Filed: Aug. 7, 1997

(86) PCT No.: PCT/GB97/02126

§ 371 Date: Feb. 22, 1999

§ 102(e) Date: Feb. 22, 1999

(87) PCT Pub. No.: WO98/09143

PCT Pub. Date: Mar. 5, 1998

(30) Foreign Application Priority Data

Aug. 28, 1996 (GB) .................................................. 9617912

(51) Int. Cl.⁷ .............................. G01K 17/00; G01K 1/02

(52) U.S. Cl. ............................ 374/29; 374/121; 374/186; 374/149

(58) Field of Search ................................ 374/10, 29, 103, 374/121, 124, 133, 135, 134, 149, 186, 204

(56) References Cited

U.S. PATENT DOCUMENTS

| | | |
|---|---|---|
| 3,123,996 | 3/1964 | Musial . |
| 3,232,113 * | 2/1966 | Malone ................................ 374/134 |
| 3,779,077 | 12/1973 | Barry et al. . |
| 4,906,105 * | 3/1990 | Geake ................................. 374/121 |

FOREIGN PATENT DOCUMENTS

| | | | |
|---|---|---|---|
| 2618349 * | 11/1977 | (DE) | ...................................... 374/29 |
| 986031 | 3/1965 | (GB) . | |
| 2 183 346 A | 6/1987 | (GB) . | |
| 2 183 346B | 7/1990 | (GB) . | |
| 2 265 460 A | 9/1993 | (GB) . | |

OTHER PUBLICATIONS

IBM Technical Disclosure Bulletin, vol. 34, No. 11, 1ˢᵗ April 1992.

* cited by examiner

*Primary Examiner*—Diego Gutierrez
*Assistant Examiner*—Lydia M. De Jesús
(74) *Attorney, Agent, or Firm*—Millen, White, Zelano & Branigan, P.C.

(57) ABSTRACT

Apparatus for and methods of meauring heat flux comprises first and second sensors arranged to pass through an oven in line astern. Each sensor measures the temperature difference across a thermally insulating layer by having one surface of each sensor being exposed to the heat flux, each sensor including thermocouple measuring junctions for measuring the temperature of the exposed surface. The first sensor is radiation-absorbing and the second sensor is reflecting. The apparatus includes additional thermocouple junctions for measuring the gas temperature and a device for recording data from the sensors and from additional thermocouple junctions. The signals from one of the sensors at one instant are correlated with the corresponding signals from the other sensor at a later instant, the time difference being the time taken for one sensor to reach a position formerly occupied by the other sensor.

23 Claims, 4 Drawing Sheets

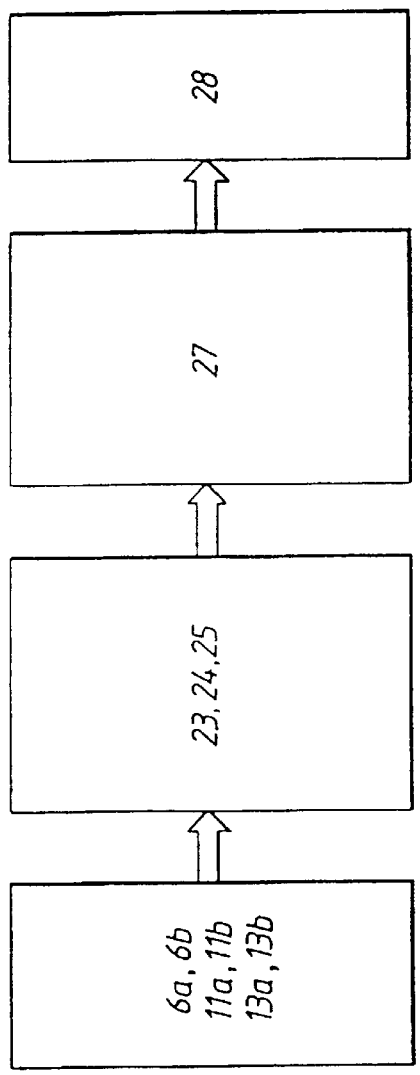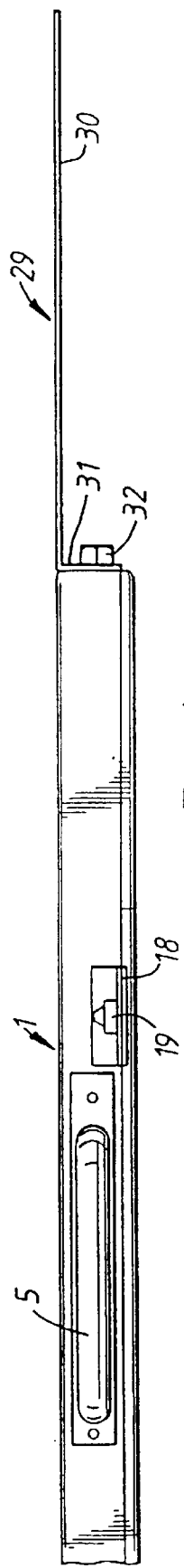
Fig. 5
Fig. 6

APPARATUS FOR AND METHODS OF MEASURING HEAT FLUX IN A TUNNEL OVEN

The invention relates to the measurement of heat flux in ovens of the kind that are suitable for use in continuous processes in which material to be heated (which may be in the form of discrete articles) is transported through the oven and is heated progressively during its passage through the oven. Such ovens are known as tunnel ovens because they are elongate and have at one end an entrance through which the material is introduced into the oven and, at the other end, an exit through which the material is withdrawn. Tunnel ovens are used for a variety of purposes, for example, to dry material or to effect the baking of food products.

The heat flux to be measured is that incident on a surface of the material to be heated. In general, the heat flux will have radiative and convective components. The material will normally be supported from below on the upper run of an endless band conveyor and, where the band is imperforate, the only exposed surface of the material will be its upper surface. Where the band is a mesh, the lower surface of the material will be partly exposed to the heat flux, but it is the heat flux incident on the upper surface of the material that is here of prime concern.

It is often important to measure separately the radiative and convective components of the heat flux, and that can be done by comparing measurements made using a radiation-absorbing surface sensor with measurements made using a reflective surface sensor. In each case, the heat flow can be determined by measuring, together with certain other quantities, the temperature difference across a thermally insulating layer located between the exposed surface of the sensor and a heat sink. Essentially, the radiation-absorbing sensor responds to the total heat flux, whereas the reflective sensor responds only to the convective component of the heat flux.

Of course, neither sensor will behave either as a black body or as a perfect reflector; each sensor will both absorb and reflect radiation incident on it. It is strictly necessary only that the two sensors should have different absorptivities, but the more nearly the radiation-absorbing sensor behaves as a black body and the more nearly the reflective sensor behaves as a perfect reflector the better the apparatus will perform. Throughout the specification, references to a sensor being radiation-absorbing or radiation-reflecting are to be understood taking account of those facts.

An apparatus having two such sensors and arranged to operate in that way is described in U.K. Patent Specification No. 2 183 346B. Typically, the heat flux will vary significantly along the length of a tunnel oven, with considerable variations occurring over relatively small distances. That will be especially marked when, for example, the heat flux is primarily radiative and derives from burners or other heating elements extending across the width of the oven at intervals along its length. Thus, the axial profile of the heat flux will show pronounced peaks and troughs, and the apparatus of the invention is intended to enable the precise form of that profile to be ascertained.

Because of the high spatial frequency of the fluctuations of the heat flux along the length of the oven, it seems clear that the two sensors must pass through the oven side-by-side. In a well designed oven, variations in the heat flux across the width of the oven will be small, but they will not usually be entirely negligible. Therefore, in order to minimise the effect of those variations across the width of the oven, the two sensors must be situated close together. It has now been found, however, that placing the two sensors sufficiently close together to render negligible the effects of transverse variations in the heat flux results in an inadequate degree of thermal insulation between them.

This invention provides apparatus for measuring heat flux in a tunnel oven, which comprises first and second sensors and which can be conveyed through such an oven by the means used to convey through the oven the material to be heated with the first and second sensors in line astern, wherein each sensor comprises a layer of a thermally insulating material and means for providing a signal representing the temperature difference between the two surfaces of the layer, one surface of the sensor being in contact with a heat sink and the other surface of the sensor being exposed, and each sensor including means for giving a signal representing the temperature of the exposed surface of the sensor, the first sensor is radiation-absorbing and the second sensor is reflecting, the exposed surfaces of the two sensors are substantially coplanar and the two sensors are spaced apart from one another, and which apparatus includes means for giving a signal representing the gas temperature in the vicinity of the exposed surfaces of the sensors, and which apparatus also comprises means for periodically recording data derived from the signals from each of the sensors and from the means for measuring the gas temperature in the vicinity of the two exposed surfaces, and wherein the recording means is arranged to correlate the signals from one of the sensors at one instant, with the corresponding signals relating to the other sensor at a later instant, the difference in time between the two instants being, or being adjustable to be, equal to the time taken, when in use the apparatus is being conveyed through the tunnel oven, for one sensor to reach a position formerly occupied by the other sensor.

In the apparatus of the invention, because the two sensors pass through the oven, not side-by-side, but in line astern, any effect that variations in the heat flux across the width of the oven may have on the data gathered using the apparatus is not affected by the separation between the two sensors, with the result that a separation large enough to secure adequate thermal isolation of the sensors can be used. The minimum separation between the two sensors is advantageously at least 5 mm and preferably at least 7 mm.

The manner in which the recording means operates avoids the need for a side-by-side arrangement of the sensors because, instead of recording the data from the two sensors at the same instant, when the two sensors are at different positions along the length of the oven, the data from the two sensors are recorded at different instants so chosen that the data from one sensor, when it is in one position, is compared with data from the other sensor when it is in the same position.

Advantageously, the means for measuring the gas temperature in the vicinity of the exposed surfaces of the two sensors comprises means for measuring the gas temperature in the vicinity of the exposed surface of one sensor and means for measuring the gas temperature in the vicinity of the exposed surface of the other sensor, and the recording means is arranged to correlate the signal representing the gas temperature in the vicinity of the exposed surface of each sensor with the other signals from that sensor. Although the gas temperature will often not vary greatly over a distance equal to that separating the centres of the two sensors, the provision of separate gas temperature measuring means for each sensor does give improved accuracy.

Advantageously, in each sensor, a thermopile constitutes the layer of a thermally insulating material and the means for providing a signal representing the temperature difference across the layer. A thermopile comprises a piece of thin film of a plastic material in which are embedded thermocouples connected in series and so arranged that the cold junction of each thermocouple is located close to one surface of the film and the hot junction of each thermocouple is located close to the other surface of the film. The use of a plurality of thermocouples connected in series both gives a spread of readings over the area where the thermocouple junctions are situated and, more importantly, gives a larger signal for a given temperature difference. Further, because of the construction of a thermopile, it is possible to arrange that it has a small thermal capacity and hence a short response time.

Advantageously the exposed surfaces of the sensors are each rectangular in shape and they are so arranged that their major axes are parallel to each other. The sensors are then spaced apart from each other in the direction of the minor axes of their exposed surfaces so that, in operation, the apparatus passes through the oven with the major axes of the exposed surfaces of the sensors perpendicular to the direction of travel of the apparatus.

It is desirable that the area of the exposed surfaces of the sensors should be large because that permits the use of thermopiles with a large number of junctions and so provides a larger signal representing the temperature difference across the layer of a thermally insulating material. On the other hand, it has been found that increasing the linear dimension of the exposed surfaces of the sensors in the direction of travel of the apparatus through the oven impairs the spatial resolution of the apparatus for the variations in heat flux in that direction.

The length of the minor axis of the exposed surface of each sensor advantageously does not exceed 75 mm and preferably does not exceed 50 mm.

Different considerations apply to the linear dimensions of the exposed surfaces of the sensors in a direction perpendicular to the direction of travel of the apparatus through the oven, for it has been found that increasing those linear dimensions gives improved repeatability of measurements taken during successive passages of the apparatus through the oven. That is believed to be because, as is observed above, there will be some variations across the width of the oven in the magnitude of the heat flux, and so measurements made by the apparatus will in general depend on the precise position of the apparatus across the width of the oven. When the linear dimensions of the exposed surfaces of the sensors in a direction perpendicular to the direction of travel of the apparatus through the oven are sufficiently large, the dependency of the measurements on the position of the apparatus across the width of the oven is reduced so that repeatability can be achieved without the need for precise positioning of the apparatus.

The length of the major axis of the exposed surface of each sensor is advantageously at least 50 mm and preferably at least 75 mm.

The heat sink may comprise a metal block. Advantageously, the sensors are mounted on portions of the metal block that are raised above the upper surface of the remainder of the block. Preferably, the raised portions of the metal block are at least 5 mm above the upper surface of the remainder of the block.

Advantageously, an edge of the exposed surface of one of the sensors is close to one edge of the upper surface of the apparatus. Then, by putting the apparatus in the oven so oriented that the two sensors pass through the oven side-by-side, it can be arranged that the sensor that is close to an edge of the upper surface of the apparatus is close to a side wall of the oven and, using the readings from that sensor only, information can be obtained about the heat flux close to that side wall of the oven. It is preferable that that sensor is the one having the radiation-absorbing upper surface.

The apparatus is advantageously provided with a removable extension arranged to provide a horizontal surface substantially coplanar with the upper surface of the casing and extending away from the said one end of the casing. As is explained below, the provision of such a plate eliminates or reduces the effect on the measurements that might otherwise result from the disturbance of the gas flow within the oven caused by the presence of the apparatus. The plate is detached when, as described above, the apparatus is to be used to measure the heat flux close to a side of the oven.

It is important that, when the apparatus is in use, the periodically recorded data is recorded at sufficiently small time intervals. Advantageously, the recording means is arranged to log data from the sensors and from the means for measuring the gas temperature at a frequency of at least 2 $sec^{-1}$. Preferably, the said frequency is at least 3 $sec^{-1}$.

Advantageously, the recording means is programmable to enable the apparatus to be used at different conveyor speeds. Preferably the recording means is arranged to be programmable by feeding into it data giving the length of the oven with which the apparatus is to be used and the time taken for the apparatus to be conveyed through the oven.

Advantageously, the recording means is a microcontroller comprising a microprocessor, RAM and an EPROM.

The invention also provides a method of measuring the longitudinal heat flux profile in a tunnel oven, which comprises adjusting the delay in apparatus according to the invention in accordance with the speed at which material to be heated is conveyed through the oven, causing the apparatus to be conveyed through the oven and downloading the data recorded by the apparatus to a computer.

One form of apparatus for measuring heat flux in a tunnel oven and constructed in accordance with the invention will now be described, by way of example, with reference to the accompanying drawings, in which:

FIG. 5 is a block diagram; and

FIG. 6 is a side view of part of the apparatus with an extension fitted.

Figure 1:
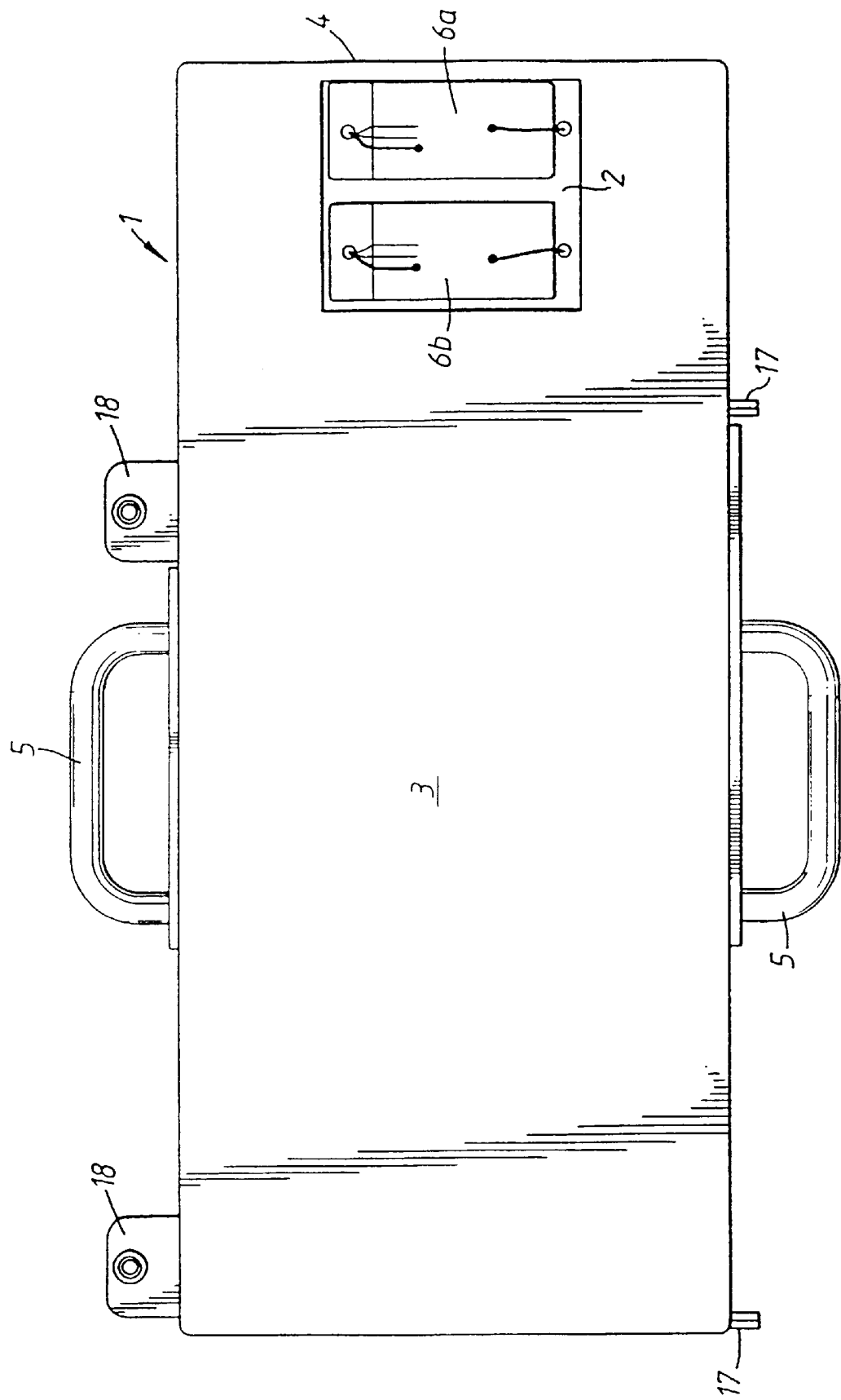
FIG. 1 is a plan view of the apparatus.

Referring to FIG. 1 of the accompanying drawings, the apparatus comprises a casing, which is indicated generally by the reference numeral 1 and has the shape of a shallow rectangular parallelepiped. A rectangular aperture 2 is formed in the upper wall 3 of the casing and close to the leading end 4 of the casing, that is to say, the end of the casing that, in use, enters the oven first. Secured to the sides of the casing 1 are two carrying handles 5.

Within the aperture 3, there are located two sensors 6a and 6b, respectively. Each of the sensors 6a and 6b comprises a thermopile, that is to say, a plurality of thermocouples connected in series embedded in a lamina of a plastics material, with the measurement junctions of the thermocouples exposed at one surface (here the upper surface) of the plastics material and the reference junctions of the thermocouples exposed at the other surface (here the lower surface) of the plastics material. The two sensors 6a and 6b are each rectangular, and they are mounted side-by-side, but spaced apart from each other, with their longitudinal axes extending in the direction of the width of the casing 1.

Figure 2:
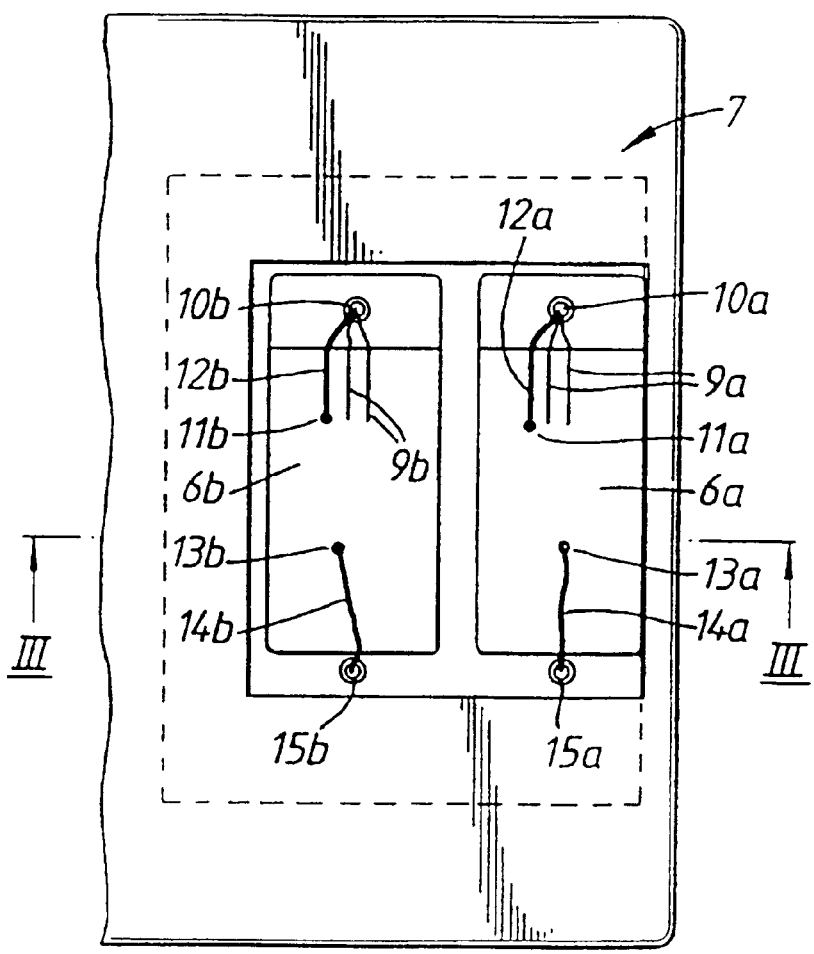
FIG. 2 is a plan view, on a larger scale than FIG. 1, of a part of the apparatus.

The sensors 6a and 6b differ from one another in that the sensor 6a, which is situated nearer to the leading end 4 of the casing 1 is radiation-absorbing, whereas the sensor 6b, which is situated further from the leading end of the casing 1 is radiation-reflecting. The two sensors 6a and 6b are mounted on a block, which is indicated generally by the reference numeral 7 (see FIG. 2). The block 7 is made of a metal with a suitably high thermal conductivity, aluminium being preferred on the grounds of cost and weight.

Figure 3:
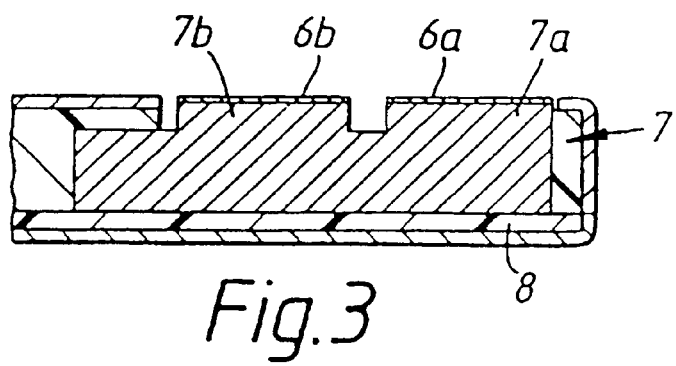
FIG. 3, is a diagrammatic cross-section taken on the line III—III in FIG. 2.

The sensors 6a and 6b are mounted on raised portions 7a and 7b, respectively, of the block 7 (see FIG. 3). The raised portions 7a and 7b are rectangular as seen in plan and they are of the same width as the sensors 6a and 6b. The mounting of the sensors 6a and 6b on raised portions of the block 7, and the fact that there is a significant horizontal separation between the raised portions 7a and 7b provides good thermal separation between the sensors. The block 7 is supported on, and surrounded by, a mass of a thermally insulating material 8.

The linear dimensions of the exposed surfaces of the sensors 6a and 6b are approximately 40×100 mm, the upper surfaces of the raised portions of the block 7 are approximately 6 mm above the upper surface of the remainder of the block, and the separation between the sensors is approximately 8 mm.

From the thermopiles of each of the sensors 6a and 6b, a pair of leads, 9a and 9b, respectively, pass through bores 10a and 10b, respectively, in the block 7, to the underside of the block. Mounted on the upper surface of each of the sensors 6a and 6b is a thermocouple measurement junction 11a or 11b, respectively. A pair of leads 12a or 12b runs from each of the thermocouple junctions 11a and 11b, respectively, to one of the bores 10a and 10b, respectively, and thence to the underside of the block 7.

Whereas the thermopiles give an e.m.f. indicative of the temperature differences across, and hence of the heat flux through, the plastics laminas of the sensors 6a and 6b, respectively, the thermocouple measurement junctions 11a and 11b enable a measurement to be made of the temperatures of the upper surfaces of the sensors 6a and 6b, respectively.

Each of the sensors 6a and 6b has associated with it a thermocouple junction 13a or 13b, respectively, from which a flexible pair of leads 14a or 14b runs, respectively, through a bore 15a or 15b, respectively, in the block 7 to the underside of the block 7. The thermocouple measurement junctions 13a and 13b permit measurement of the gas temperature a short distance above the upper surface of the associated sensors 6a and 6b, respectively. Because of the flexibility of the pairs of leads 14a and 14b, the precise positions of the thermocouple junctions 13a and 13b, respectively, can readily be adjusted.

Figure 4:
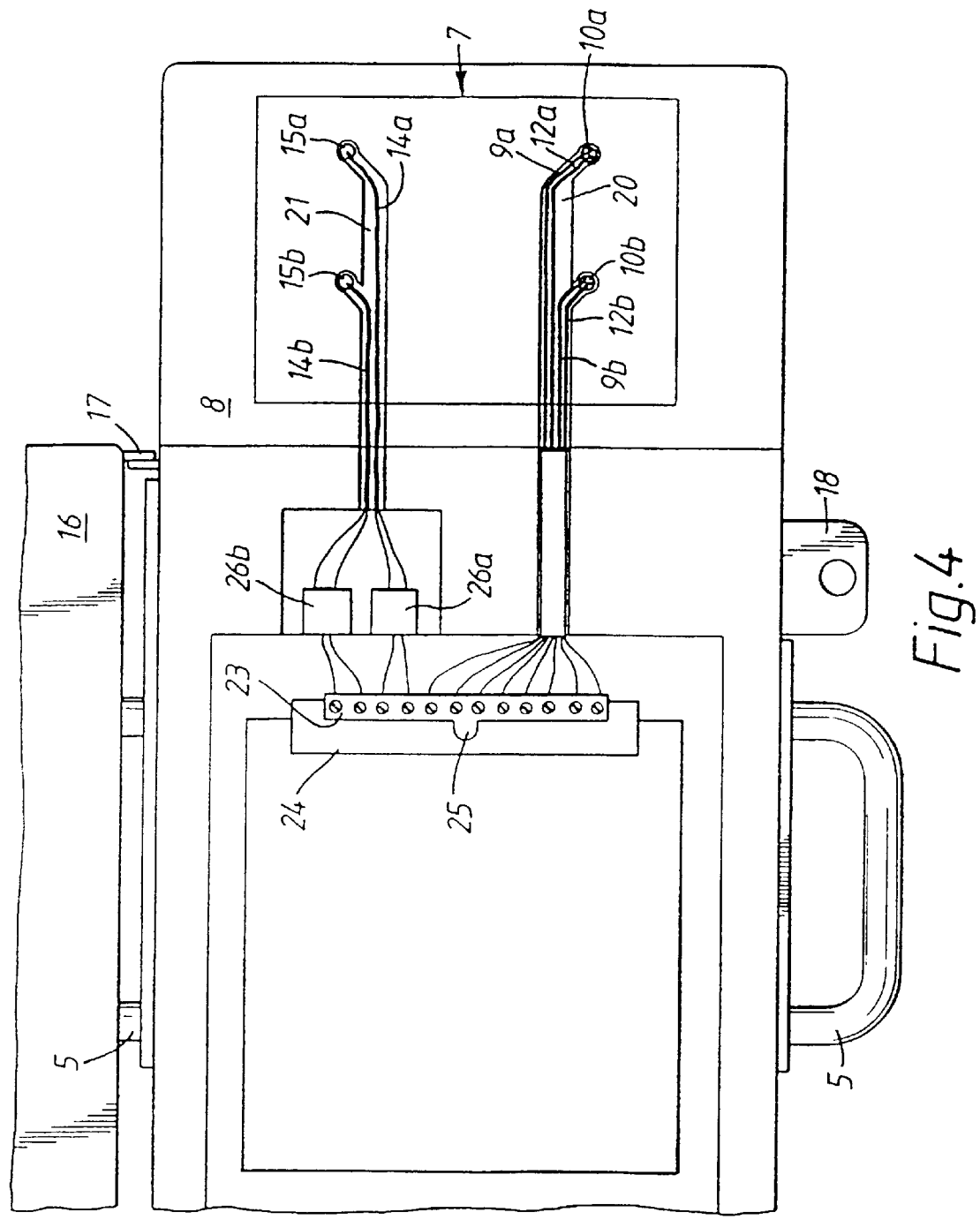
FIG. 4 is a view, on the same scale as FIG. 2, of a part of the apparatus seen from below with parts of the casing open or removed.

A part 16 of the underside of the casing 1 (see FIGS. 1 and 4) is hinged to the remainder of the casing at 17 and is releasably secured in its closed position by means of two pairs of flanges 18, each of which has (see FIG. 6) a threaded aperture for engagement by a closure screw 19 when, in the closed position of the part 15, the flanges of each pair are adjacent to each other. As seen in FIG. 4, the part 16 is in its open position. Further, in order to give access to the underside of the block and its immediate surroundings, a removable panel (which is held in position by screws) is provided in the underside of the case 1. The removable panel is not shown and FIG. 4 shows the underside of the casing with the panel removed.

The underside of the block 7 is provided with channels 20 and 21, respectively. The channel 20 runs from the lower ends of the bores 10a and 10b to the rear edge of the underside of the block 7, and affords a passage for the pairs of leads 9a and 9b from the series-connected thermocouples of the thermopiles of the two sensors 6a and 6b, respectively, and for the pairs of leads 12a and 12b from the thermocouple measurement junctions 11a and 11b mounted on the upper surface of the sensors 6a and 6b. The channel 21 runs from the lower ends of the bores 15a and 15b to the rear edge of the underside of the block and affords a passage for the pairs of leads 14a and 14b from the thermocouple measurement junctions 13a and 13b that are provided to measure the gas temperatures above the upper surfaces of the sensors 6a and 6b, respectively.

After leaving the channel 20, the four pairs of leads 9a, 9b, 12a and 12b pass through a continuation of that channel formed in the insulating material 8 and then through the interior of a helical spring 22 which, while being flexible, serves to protect them mechanically. After leaving the interior of the helical spring 22, the eight individual leads making up the four pairs of leads 9a, 9b, 12a and 12b are connected to conductors on a PCB, that is to say, a printed circuit board (not shown) via eight of the twelve terminals of a screw clamp terminal 23.

The body of the screw clamp terminal 23 is made of a plastics material that combines relatively high thermal conductivity with sufficiently high electrical resistivity to ensure substantially complete electrical insulation between the individual terminals. The screw clamp terminal 23 is surrounded on three sides by an aluminium heat sink 24, which ensures a high degree of temperature uniformity as between the individual terminals. Further, a thermistor is provided at 25 to give a signal indicative of the temperature of the aluminium heat sink 24.

After leaving the channel 21, the two pairs of leads 14a and 14b pass through a continuation of that channel formed in the insulating material to a cavity 26, where the two individual leads making up the pair of leads 14a are connected to a 2-pin plug 26a, and the individual leads of the pair of leads 14b are connected to another 2-pin plug 26b. The plugs 26a and 26b form part of a plug-and-socket connector. From the socket part of the connector (which part is not shown), four individual leads go to the remaining four terminals of the screw clamp terminal 23.

The metals of which the electrically conducting parts of the plugs 26a and 26b are made are the same as those of which the individual leads of the pairs of leads 14a and 14b are made, and the same is true of the electrically conducting parts of the associated sockets (not shown) and of the leads from the sockets to the screw clamp terminal 23. Further, the arrangement is such that the use of the plug-and-socket connectors does not result in the introduction of further, unwanted thermocouple junctions. Then, so far as thermo-electric effects are concerned, the leads from the sockets to the screw clamp terminal 23 can be regarded as mere extensions of the individual leads of the pairs of leads 14a and 14b.

Because the thermocouple measurement junctions 13a and 13b, which are used to measure the gas temperature, are situated above the upper surfaces of the sensors 6a and 6b, they are prone to damage. The use of the plugs 26a and 26b, together with the associated sockets (not shown) facilitate replacement of the leads 14a and 14b and hence of thermocouple measurement junctions 13a and 13b as and when required.

In the case of the pairs of leads 12a and 12b from the thermocouple measurement junctions 11a and 11b, respectively, the junctions between the individual leads of those pairs of leads and the individual terminals of the screw clamp terminal 23 constitute the reference junctions of the thermocouples. In the case of the thermocouples used to measure the gas temperature, which include the thermocouple measurement junctions 13a and 13b, the reference junctions are those between the leads from the plug-and-socket connector and the individual terminals of the screw clamp terminal to which they are connected.

The printed circuit board and its associated circuitry (both not shown) constitute the apparatus for measuring the e.m.f.s generated by the thermocouples (including those in the thermopiles), and the junctions between the conductors on the printed circuit board constitute additional junctions associated with the measuring apparatus and, as required, the arrangement ensures that those junctions are maintained at substantially the same temperature.

In the case of the pairs of leads 9a and 9b from the thermopiles of the sensors 6a and 6b, both the junctions between the individual leads of those pairs of leads and the individual terminals of the screw clamp terminal 23, and the connections between the screw clamp terminal and the printed circuit board, constitute additional junctions associated with the measuring apparatus. Again, the additional junctions are maintained at substantially the same temperature, as is required.

The apparatus is battery-operated, the batteries (which are not shown) being housed within the interior of the casing 1.

The signals that are carried by conductors on the printed circuit board from the individual terminals of the screw clamp terminal 23, and signals from the thermistor 25, pass to an analogue-to-digital converter 27, as is indicated schematically in FIG. 5. The corresponding digital signals emanating from the analogue-to-digital converter 27 are passed to a recording means in the form of a microcontroller 28 (see FIG. 5), which includes a microprocessor, an EPROM and RAM.

The program, together with basic numerical data, are stored in the EPROM. The RAM is used by the program, and it also serves to store the data acquired by the apparatus during a passage of the apparatus through the oven. After the apparatus has passed through the oven, the data that has been acquired during the passage and stored in the RAM is downloaded to a computer.

The data is recorded periodically at intervals of 0.25 sec, that is to say, at a frequency of 4 sec$^{-1}$. If that frequency is not high enough, it will be found that the results obtained are not repeatable.

The microcontroller 28 so records the data from the two sensors 6a and 6b, and from the associated thermocouples (those having the measurement junctions 13a and 13b) for measuring the gas temperature in the region of the sensors, that the readings from the leading sensor 6a at a given instant are correlated with the readings from the following sensor 6b at a later instant. The delay between the two instants is equal to the time taken for the apparatus to travel, in the oven, a distance equal to the separation between the centres of the two sensors.

In order to enable the apparatus to be used in ovens in which the articles to be heated are conveyed at different speeds, or in a given oven in which that speed is adjustable, the microcontroller 28 can be set so that the delay is appropriate for the speed. Because the length of the oven and the time taken for an article to be conveyed through the oven are easily measurable quantities, the microcontroller 28 is such that the appropriate delay can be set simply by entering that length and that time.

In ovens in which the heating has a significant convective component, the gas within the oven will have a significant velocity, and the conveying of the apparatus through the oven will disturb the gas flow over the apparatus, especially in the vicinity of the leading end 3 of the casing 1, and therefore in the vicinity of the sensors 6a and 6b. Such a disturbance of the gas flow over the sensors 6a and 6b may result in there being a difference between the magnitudes of the convective component of the heat flux incident on the two sensors, even though the comparison between those magnitudes is made, not at the same time, but at the same position of the two sensors. If that occurs, there will be an error in the measurement of the radiative and convective components of the heat flux, and probably also an error in the measurement of the total heat flux.

In order to prevent or reduce the risk of errors resulting from a disturbance of the gas flow pattern by the apparatus as it passes through the oven, the apparatus is provided with a detachable extension, which is indicated generally by the reference numeral 29 (see FIG. 6). The extension 29 consists of a rectangular plate 30 and at its rear end a downwardly extending flange 31 formed with apertures to receive bolts 32 for releasably securing the extension to the front of the casing 1.

When the extension 29 is secured to the casing 1, the upper surface of the rectangular plate 30, which extends over the entire width of the casing 1, is flush with the upper surface of the casing. As has been pointed out above, the main disturbance of the gas flow caused by the passage of the apparatus through the oven is in the vicinity of the leading end of the apparatus which, when the extension 29 is not fitted, is in the vicinity of the sensors 6a and 6b. When the extension 29 is fitted, the leading end of the apparatus is the leading edge of the plate 30, so that the region of significant disturbance of the gas flow is displaced forwards, away from the sensors 6a and 6b, by a distance equal to the length of the plate.

In use, the apparatus is placed on the conveyor that is used to convey material to be heated through the oven, with the sides of the casing 1 extending in the direction of movement and the leading end 4 in front. The extension 29 is normally fitted. The microcontroller 28 has been programmed to give the appropriate delay as explained above. Also, before the apparatus is allowed to enter the oven, the upper surfaces of the sensors 6a and 6b must be brought up to a temperature exceeding the dewpoint of the gas in the oven. That can be achieved by exposing those surfaces, but not the remainder of the apparatus, to a temperature-controlled air-flow. If the upper surfaces of the sensors 6a and 6b are not brought up to the required temperature, there will be condensation on the upper surfaces of the sensors, and the upper surface of the sensor 6b will become significantly less reflective, so that the readings will be seriously distorted.

When the apparatus has passed through the oven, the data logged by the microcontroller 28 is downloaded to a computer, and the heat flux profile along the length of the oven, for both the convective component and the radiative component of the heat flux, is obtained.

If, as is sometimes the case, it is desired to investigate the heat flux profile close to a side of the oven, the extension 29 is removed by releasing the bolts 32, and the apparatus is so placed on the conveyor that the sides of the casing 1 extend across the width of the oven and the end 3 of the casing is close to the side of the oven. The microcontroller 28 is then programmed to record signals from the sensor 6a only, instead of recording signals from both of the sensors 6a and 6b.

What is claimed is:

1. Apparatus for measuring heat flux in a tunnel oven comprising conveying means to convey through the oven material to be heated and containing a gas which surrounds the material to be heated, the apparatus comprising first and second sensors and which are conveyed through such an oven by the conveying means with the first and second sensors in line astern, wherein each sensor has a first surface and a second surface and comprises a layer of a thermally insulating material between said first and second surfaces and means for providing a signal representing a temperature difference across the layer, the first surface of each sensor being in contact with a heat sink and the second surface of each sensor being exposed, and each sensor including means for giving a signal representing the temperature of the exposed surface of the sensor, the first sensor is radiation-absorbing and the second sensor is reflecting, the exposed surfaces of the two sensors are substantially coplanar and the two sensors are spaced apart from one another, and which apparatus includes means for giving a signal representing the gas temperature in the vicinity of the exposed surfaces of the sensors, and which apparatus also comprises means for periodically recording data derived from the signals from each of the sensors and from the means for measuring the gas temperature in the vicinity of the two exposed surfaces, and wherein the recording means is arranged to correlate the signals from one of the sensors at one instant, with the corresponding signals relating to the other sensor at a later instant, the difference in time between the two instants being, or being adjustable to be, equal to the time taken, when in use the apparatus is being conveyed through the tunnel oven, for one sensor to reach a position formerly occupied by the other sensor.

2. Apparatus as claimed in claim 1, wherein the minimum separation between the two sensors is at least 5 mm.

3. Apparatus as claimed in claim 2, wherein the minimum separation between the two sensors is at least 7 mm.

4. Apparatus as claimed in claim 1, wherein the means for measuring the gas temperature in the vicinity of the exposed surfaces of the two sensors comprises means for measuring the gas temperature in the vicinity of the exposed surface of one sensor and means for measuring the gas temperature in the vicinity of the exposed surface of the other sensor, and wherein the recording means is arranged to correlate the signal representing the gas temperature in the vicinity of the exposed surface of each sensor with the other signals from that sensor.

5. Apparatus as claimed in claim 1, wherein, in each sensor, a thermopile constitutes the layer of a thermally insulating material and the means for providing a signal representing the temperature difference across the layer.

6. Apparatus as claimed in claim 5, wherein the exposed surfaces of the sensors are each rectangular in shape and they are so arranged that their major axes are parallel to each other.

7. Apparatus as claimed in claim 6, wherein the length of the minor axis of the exposed surface of each sensor does not exceed 75 mm.

8. Apparatus as claimed in claim 7, wherein the length of the minor axis of the exposed surface of each sensor does not exceed 50 mm.

9. Apparatus as claimed in claim 6, wherein the length of the major axis of the exposed surface of each sensor is at least 50 mm.

10. Apparatus as claimed in claim 9, wherein the length of the major axis of the exposed surface of each sensor is at least 75 mm.

11. Apparatus as claimed in claim 1, wherein the heat sink comprises a metal block.

12. Apparatus as claimed in claim 11, wherein the sensors are mounted on portions of the metal block that are raised above the upper surface of the remainder of the block.

13. Apparatus as claimed in claim 12, wherein the raised portions of the metal block are at least 5 mm above the upper surface of the remainder of the block.

14. Apparatus as claimed in claim 1, having walls which define the lateral boundaries of the apparatus and an upper surface, the walls and the upper surface meeting to form edges, wherein an edge of the exposed surface of one of the sensors is close to an edge formed by the meeting of the upper surface of the apparatus with the walls.

15. Apparatus as claimed in claim 14, wherein the sensor of which an edge of the exposed surface is close to an edge of the upper surface of the apparatus is the sensor of which the exposed surface is radiation-absorbing.

16. Apparatus as claimed in claim 14, wherein the apparatus is provided with a removable extension arranged to provide a horizontal surface substantially coplanar with the upper surface of the casing and extending away from the said one end of the casing.

17. Apparatus as claimed in claim 1, wherein the recording means is arranged to log data from the sensors and from the means for measuring the gas temperature at a frequency of at least 2 $\sec^{-1}$.

18. Apparatus as claimed in claim 17, wherein the said frequency is at least 3 $\sec^{-1}$.

19. Apparatus as claimed in claim 1, wherein the recording means is programmable to enable the apparatus to be used at different conveyor speeds.

20. Apparatus as claimed in claim 19, wherein the recording means is programmable by feeding into it data giving the length of the oven with which the apparatus is to be used and the time taken for the apparatus to be conveyed through the oven.

21. Apparatus as claimed in claim 1, wherein the recording means is a microcontroller comprising a microprocessor, RAM and an EPROM.

22. A method of measuring the longitudinal heat flux profile in a tunnel oven, which comprises the step of providing an apparatus for measuring heat flux in a tunnel oven comprising conveying means to convey through the oven material to be heated and containing a gas which surrounds the material to be heated, the apparatus comprising first and second sensors and which can be conveyed through such an oven by the conveying means with the first and second sensors in line astern, wherein each sensor has a first surface and a second surface and comprises a layer of a thermally insulating material between said first and second surfaces and means for providing a signal representing a temperature difference across the layer, the first surface of each sensor being in contact with a heat sink and the second surface of each sensor being exposed, and each sensor including means for giving a signal representing the temperature of the exposed surface of the sensor, the first sensor is radiation-absorbing and the second sensor is reflecting, the exposed surfaces of the two sensors are substantially coplanar and the two sensors are spaced apart from one another, and which apparatus includes means for giving a signal representing the gas temperature in the vicinity of the exposed surfaces of the sensors, and which apparatus also comprises means for periodically recording data derived from the signals from each of the sensors and from the means for measuring the gas temperature in the vicinity of the two exposed surfaces, and wherein the recording means is arranged to correlate the signals from one of the sensors at one instant with the corresponding signals relating to the other sensor at a later instant, the difference in time between the two instants being, or being adjustable to be, equal to the time taken, when in use the apparatus is being conveyed through the tunnel oven, for one sensor to reach a position formerly occupied by the other sensor and the step of adjusting the difference in time between the two instants in accordance with the speed at which material to be heated is conveyed through the oven, causing the apparatus to be conveyed through the oven and downloading the data recorded by the apparatus to a computer.

23. A method of measuring the longitudinal heat flux profile in a tunnel oven, the tunnel of the oven containing a gas, the method comprising the steps of:

(a) conveying through the tunnel oven a heat flux measuring apparatus comprising a heat flux sensor having a radiation absorbing surface and a heat flux sensor having a radiation reflecting surface, each sensor comprising a layer of thermally insulating material and means for providing a signal representing a temperature difference across the layer, the apparatus further comprising means for measuring the gas temperature in the vicinity of the sensors and being conveyed through the tunnel oven with the sensors in line astern;

b) obtaining a signal from each of the sensors representing the temperature difference across its insulating layer;

c) recording data derived from the signals from the sensors and from the means for measuring the gas temperature;

d) determining a time delay taken for one sensor to reach a position formerly occupied by the other sensor; and e) correlating the signal from one of the sensors at one instant with the signal from the other sensor at another instant at the end of a time period equal to the time delay.

* * * * *